United States Patent
Bonora et al.

(10) Patent No.: US 11,298,988 B2
(45) Date of Patent: Apr. 12, 2022

(54) ROTARY JOINT ASSEMBLY FOR A TIRE INFLATION SYSTEM

(71) Applicant: DANA ITALIA S.R.L., Arco (IT)

(72) Inventors: Mario Bonora, Torbole sul Garda (IT); Daniele Tonini, Ledro (IT)

(73) Assignee: DANA ITALIA S.R.L., Arco (IT)

( * ) Notice: Subject to any disclaimer, the term of this patent is extended or adjusted under 35 U.S.C. 154(b) by 343 days.

(21) Appl. No.: 16/347,073

(22) PCT Filed: Oct. 24, 2017

(86) PCT No.: PCT/EP2017/077083
§ 371 (c)(1),
(2) Date: May 2, 2019

(87) PCT Pub. No.: WO2018/082963
PCT Pub. Date: May 11, 2018

(65) Prior Publication Data
US 2020/0062047 A1    Feb. 27, 2020

(30) Foreign Application Priority Data
Nov. 4, 2016 (EP) ..................................... 16425103

(51) Int. Cl.
*B60C 23/00*        (2006.01)
(52) U.S. Cl.
CPC .. *B60C 23/00345* (2020.05); *B60C 23/00318* (2020.05); *B60C 23/00363* (2020.05)
(58) Field of Classification Search
CPC ............ B60C 23/003; B60C 23/00305; B60C 23/00309; B60C 23/00318;
(Continued)

(56) References Cited

U.S. PATENT DOCUMENTS

| 4,804,027 A | * | 2/1989 | Runels ................. B60C 23/003 |
| | | | 152/417 |
| 6,199,611 B1 | * | 3/2001 | Wernick ............... B60C 23/003 |
| | | | 152/417 |

(Continued)

FOREIGN PATENT DOCUMENTS

| DE | 102014221813 | 12/2015 |
| GB | 2477816 | 8/2011 |

(Continued)

OTHER PUBLICATIONS

European Patent Office, International Search Report and Written Opinion in Application No. PCT/EP2017/077083, dated Oct. 24, 2017, 10 pages, Rijswijk, Netherlands.

*Primary Examiner* — Kip T Kotter
*Assistant Examiner* — Emily G Castonguay
(74) *Attorney, Agent, or Firm* — McCoy Russell LLP

(57) ABSTRACT

A rotary joint assembly for a tire inflation system for a vehicle includes a stationary portion defining a first fluid passage. The stationary portion includes a support portion and having a first annular sealing face. The first fluid passage ending in the first annular sealing face. The assembly also includes at least one bearing and a rotatable portion rotatably mounted on the support portion by way of the at least one bearing. The rotatable portion defines a second fluid passage and has a second annular sealing face, the second fluid passage ending in the second annular sealing face. The rotatable portion defines an axis of rotation of the rotatable portion and a radial direction oriented perpendicular to the axis of rotation. The at least one bearing supporting an inner face of the rotatable portion, wherein the inner face of the rotatable portion faces toward the axis of rotation. An annular seal chamber is radially disposed between the first annular sealing face and the second annular sealing face and provides fluid communication between the first fluid passage (Continued)

and the second fluid passage. The at least one bearing and the annular seal chamber at least partially overlap along an axial direction oriented in parallel to the axis of rotation.

15 Claims, 2 Drawing Sheets

(58) Field of Classification Search
CPC ........ B60C 23/00336; B60C 23/00345; B60C 23/00363; B60C 23/00381
See application file for complete search history.

(56) References Cited

U.S. PATENT DOCUMENTS

| | | | | |
|---|---|---|---|---|
| 6,325,123 B1* | 12/2001 | Gao | ...................... | B60C 23/003 |
| | | | | 152/416 |
| 6,719,028 B2* | 4/2004 | D'Amico | .............. | B60C 23/003 |
| | | | | 152/415 |
| 8,915,274 B2* | 12/2014 | Eschenburg | .......... | B60C 23/003 |
| | | | | 152/416 |

FOREIGN PATENT DOCUMENTS

| | | |
|---|---|---|
| WO | 2013154976 | 10/2013 |
| WO | 2013156430 | 10/2013 |

* cited by examiner

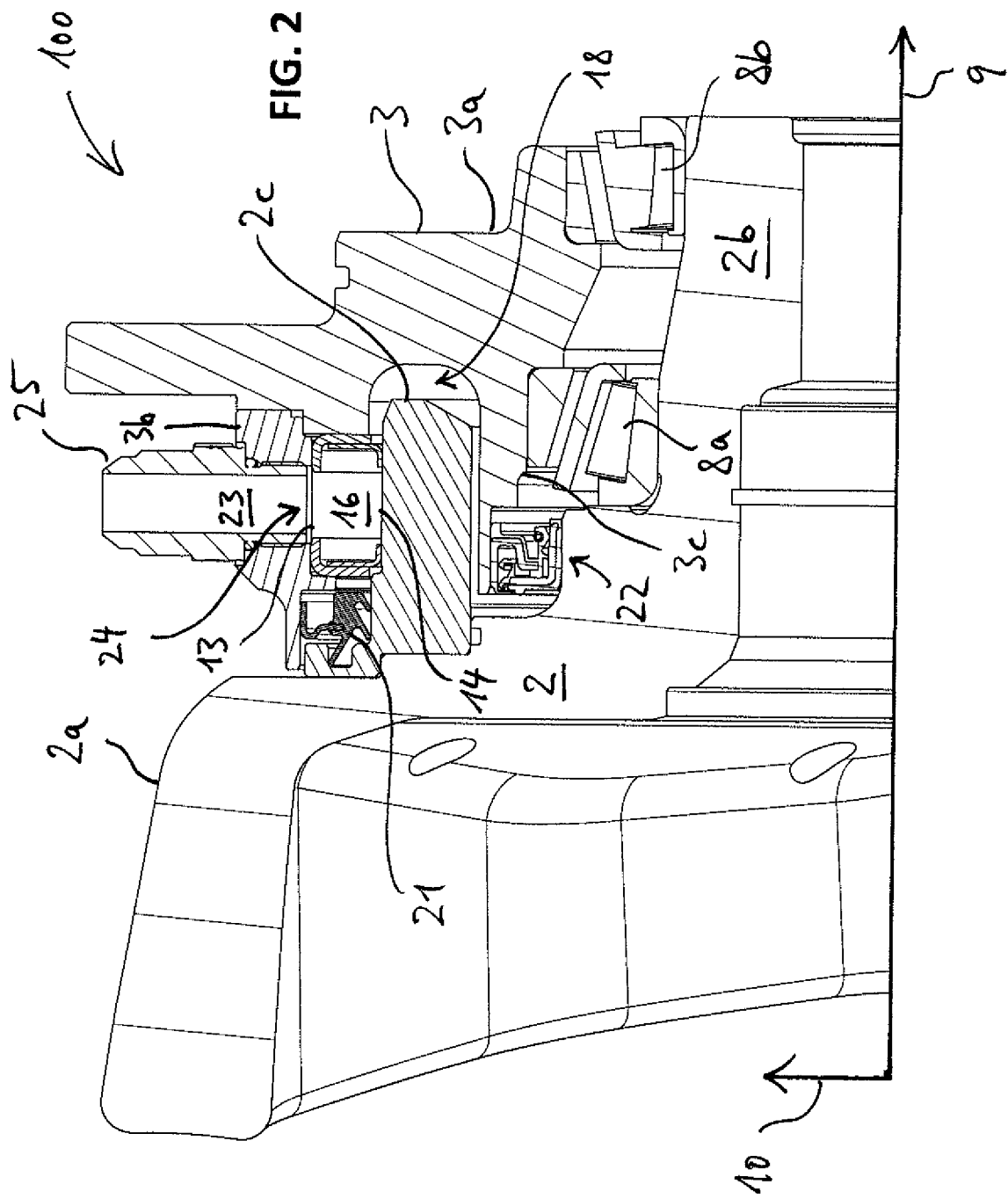

ROTARY JOINT ASSEMBLY FOR A TIRE INFLATION SYSTEM

BACKGROUND OF THE INVENTION

The invention relates primarily to a rotary joint assembly for a tire inflation system.

Tire inflation systems are used in different types of vehicles such as trucks, tractors or earth-moving machines. The main objective of a tire inflation system is to adapt the tire pressure to different operating conditions. Typically, these conditions include at least one of the ground the vehicle is travelling on, a vehicle speed and a vehicle load. The contact patch of a tire is influenced by the tire pressure. As the tire pressure is decreased the contact patch increases. As the tire pressure is increased the contact patch decreases. For this reason, it is desirable to optimize the tire pressure depending on ground conditions. For example, a lower tire pressure may be adopted when the vehicle is traveling on soft surfaces such as gravel. On the other hand, a higher tire pressure may be chosen when the vehicle is traveling on hard surfaces such as tarmac or concrete. Hence, a tire inflation system may improve the longevity of the tire, reduce soil compaction, lower fuel consumption, and reduce overall operating costs.

Since it is desirable that the tire can be inflated and deflated during operation of the vehicle, tire inflation systems known from the prior art comprise rotary joints, also termed rotary joints or rotary seal arrangements. These may be disposed between a stationary portion of the vehicle such as an axle housing, a steering knuckle or a spindle, and a rotatable or rotating portion such as wheel hub on which the wheel and the tire may be mounted, for example. Generally, the functioning of a rotary joint is critical for the tire inflation system because the rotary joint should preferably be configured to transmit fluid used for inflating the tire from a pneumatic line to a wheel valve while the vehicle wheel is rotating. Typically, rotary seal arrangements include sealing means mounted on the stationary portion and/or on the rotatable portion. Usually, the sealing means are configured to be in sliding engagement when the wheel is rotating. In this way, the sealing means form an annular seal chamber through which fluid may be transported from a fluid source such as a compressor to the rotating tire and vice versa.

WO 2013/156430 A1 describes a spindle assembly for a tire inflation system in which some of the fluid lines are integrated in the vehicle axle. However, this solution may require the design of the rotatable portion, for example a wheel hub, to be adapted to the design of the spindle, for example. In some cases this may imply that deep bores have to be drilled in the axle which may possibly complicate the manufacturing process. The spatial extension of the assembly, in particular its axial extension, must accommodate all sealings and fluid lines. However, for many applications the length of the axle including the tire inflation system is required to be below a given maximum length.

SUMMARY

It is therefore an object of the present invention to design a preferably compact rotary joint assembly for a tire inflation system which may be manufactured and assembled in a preferably simple manner.

This object is solved by a rotary joint assembly for a tire inflation system according to claim 1. Special embodiments are described in the dependent claim.

The presently proposed rotary joint assembly for a tire inflation system for a vehicle comprises:
- a stationary portion defining a first fluid passage, comprising a support portion, and having a first annular sealing face, the first fluid passage ending in the first annular sealing face;
- at least one bearing;
- a rotatable portion rotatably mounted on the support portion by way of the at least one bearing, the rotatable portion defining a second fluid passage and having a second sealing face, the second fluid passage ending in the second sealing face, wherein the rotatable portion defines an axis of rotation of the rotatable portion and a radial direction oriented perpendicular to the axis of rotation, the at least one bearing supporting an inner face of the rotatable portion, wherein the inner face of the rotatable portion faces toward the axis of rotation; and
- an annular seal chamber radially disposed between the first annular sealing face and the second annular sealing face and providing fluid communication between the first fluid passage and the second fluid passage;
- wherein the at least one bearing and the annular seal chamber at least partially overlap along an axial direction oriented in parallel to the axis of rotation.

The fact that the at least one bearing and the annular seal chamber at least partially overlap along the axial direction renders the rotary joint assembly particularly compact.

The support portion, the first annular sealing face, and the second annular sealing face may be arranged concentrically with respect to the axis of rotation. The first annular sealing face and the second annular sealing face may be oriented in parallel to the axis of rotation. A maximum radius of the support portion, the first annular sealing face, and the second annular sealing face may be disposed, respectively, at a first, at a second and at a third radial distance from the axis of rotation. Furthermore, the second radial distance may be larger than the first radial distance, and the third radial distance may be larger than the second radial distance. Within the scope of this document, the term fluid refers to a gaseous medium such as air which may be used for inflating a pneumatic tire of an automotive vehicle.

The fact that the support portion and the first sealing face of the stationary portion may be disposed at different radial distances from the axis of rotation typically facilitates a particularly compact arrangement of the rotary joint assembly, in particular along an axial direction oriented in parallel to the axis of rotation of the rotatable portion. For example, the annular seal chamber and one or more bearings that may be disposed between the support portion and the rotatable portion for supporting the rotatable portion may be at least partially stacked along the radial direction.

The stationary portion may include an axle housing, a spindle or a knuckle, for example a steering knuckle. The rotatable portion may be configured to support a wheel and a pneumatic tire, that is a wheel and a pneumatic tire may be mounted on the rotatable portion. For example, the rotatable portion may include a wheel hub or similar rotatable component. The stationary portion and/or the rotatable portion may be made of metal or may comprise metal.

The first fluid passage may be configured to be in fluid communication with a pressure source such as a compressor and/or with a vent. The compressor and/or the vent may be mounted on the vehicle. The second fluid passage may be configured to be in fluid communication with a pneumatic tire mounted on the rotatable portion. Typically, the second fluid passage is in fluid communication with the pneumatic tire by way of a flow control valve. The pressure source may pressurize the tire via the first fluid passage, the annular seal chamber, and the second fluid passage. And the tire may be deflated via the second fluid passage, the annular seal chamber, the first fluid passage and the vent, for example. In particular, the tire may be inflated and deflated through the rotary joint assembly while the vehicle on which the rotary joint assembly and the tire are mounted is moving, i. e. while the rotatable portion is rotating relative to the stationary portion.

The annular seal chamber is configured to guide fluid that is transported from the first fluid passage to the second fluid passage or vice versa through the annular seal chamber and to prevent the leakage of fluid out of the annular seal chamber. The annular seal chamber may be formed by sealing lips, for example by a pair of sealing lips. The sealing lips forming the annular seal chamber may be axially spaced from one another. Usually, the sealing lips delimit the annular seal chamber in the axial direction, and the first and the second annular sealing face delimit the annular seal chamber in the radial direction. The sealing lips may comprise a rubber material such as PTFE.

The sealing lips or some of the sealing lips forming the annular seal chamber may be mounted on the rotatable portion, in particular on the second sealing face of the rotatable portion. These sealing lips may then be in sliding sealing engagement with the stationary portion, in particular with the first sealing face of the stationary portion. However, it is understood that additionally or alternatively the sealing lips or some of the sealing lips may be mounted on the stationary portion, in particular on the first sealing face of the stationary portion. These sealing lips may then be in sliding sealing engagement with the rotatable portion, in particular with the second sealing face of the rotatable portion.

Typically, the first annular sealing face faces away from the axis of rotation, and the second annular sealing face faces toward the axis of rotation.

The at least one bearing may comprise a pair of bearings, for example for rotatably mounting the rotatable portion on the support portion of the stationary portion. The inner face of the rotatable portion may be disposed at a fourth radial distance from the axis of rotation, wherein the second radial distance associated with the first sealing face of the stationary portion may be larger than the fourth radial distance associated with the inner face of the rotatable portion with is mounted on the at least one bearing. The stationary portion may further comprise a main portion and an annular portion. The main portion of the stationary portion may be integrally formed with the support portion of the stationary portion. The main portion of the stationary portion and the annular portion of the stationary portion may be configured as separate portions, wherein the annular portion of the stationary portion is fixedly coupled to the main portion of the stationary portion, and wherein the first annular sealing face is formed on the annular portion of the stationary portion. The annular portion of the stationary portion may be coupled to or mounted on the main portion of the stationary portion in any conventional manner. Providing the main portion of the stationary portion and the annular portion of the stationary portion as separate portions may facilitate the installation of the rotary joint assembly. However, it is understood that the annular portion of the stationary portion may likewise be integrally formed with the main portion of the stationary portion.

The main portion of the stationary portion may define a first section of the first fluid passage, and the annular portion of the stationary portion may define a second section of the first fluid passage, wherein the first and the second section of the first fluid passage are in fluid communication with one another. The rotary joint assembly may then comprise sealing means disposed at an interface of the first and the second section of the first fluid passage to prevent fluid leakage at the interface between the first and the second section of the first fluid passage.

The rotatable portion may comprise a main portion and a first axially extending annular protrusion, wherein the first axially extending annular protrusion of the rotatable portion protrudes from the main portion of the rotatable portion in parallel to the axis of rotation and toward the stationary portion. The second annular sealing face of the rotatable portion may be formed on the first axially extending annular protrusion of the rotatable portion.

The main portion of the rotatable portion and the first axially extending annular protrusion of the rotatable portion may be configured as separate portions. The first axially extending annular protrusion may then be fixedly coupled to or mounted on the main portion of the rotatable portion. The annular portion of the rotatable portion may be coupled to or mounted on the main portion of the rotatable portion in any conventional manner. Providing the main portion of the rotatable portion and the first axially extending annular protrusion of the rotatable portion as separate portions may facilitate the installation of the rotary joint assembly. However, it is understood that the first axially extending annular protrusion may likewise be integrally formed with the main portion of the rotatable portion.

The stationary portion and the rotatable portion may be configured or formed to encompass an annular space formed between the stationary portion and the rotatable portion. The annular seal chamber may be disposed within this annular space. For example, the above-described annular portion of the stationary portion may be received or at least partially received within the annular space. This design may add to the compactness of the rotary joint assembly.

The rotary joint assembly may comprise a first annular seal assembly sealing the annular space and the annular seal chamber disposed within the annular space from the atmosphere. The first annular seal assembly may comprise one or more sealing rings, for example. The first annular seal assembly may be mounted on the stationary portion and/or on the rotatable portion, in particular on a side of the rotatable portion facing toward the axis of rotation. Specifically, the sealing rings of the first annular seal assembly may be mounted on the stationary portion and/or on the rotatable portion.

In particular, the annular space may be formed between the first axially extending annular protrusion of the rotatable portion and the stationary portion. The first annular seal assembly may be disposed between the first axially extending annular protrusion of the rotatable portion and the stationary portion. For instance, the first annular seal assembly may be mounted on the first axially extending annular protrusion of the rotatable portion, in particular on a side of the first axially extending annular protrusion of the rotatable portion facing toward the axis of rotation. Specifically, the sealing rings of the first annular seal assembly may be mounted on the first axially extending annular protrusion of the rotatable portion.

The rotary joint assembly may further comprise a second annular seal assembly. The second annular seal assembly may be disposed between the stationary portion and the rotatable portion and may seal the annular space and the annular seal chamber disposed within the annular space from the at least one bearing disposed between the support portion of the stationary portion and the rotatable portion, in particular from lubricants used for lubricating the at least one bearing. The second annular seal assembly may comprise one or more sealing rings, for example. The second annular seal assembly may be mounted on the stationary portion and/or on the rotatable portion, in particular on a side of the rotatable portion facing toward the axis of rotation. Specifically, the sealing rings or some of the sealing rings of the second annular seal assembly may be mounted on the stationary portion and/or on the rotatable portion. The sealing rings or some of the sealing rings of the second annular seal assembly may be in sliding sealing contact with one another, with the stationary portion, and/or with the rotatable portion.

The rotatable portion may further comprise a second axially extending annular protrusion, wherein the second axially extending annular protrusion of the rotatable portion protrudes from the main portion of the rotatable portion in parallel to the axis of rotation and toward the stationary portion. For example, the above-described annular space may be formed between the first and the second axially extending annular protrusion of the rotatable portion and the stationary portion. The second annular seal assembly may be disposed between the second axially extending annular protrusion of the rotatable portion, in particular on an inner side of the second axially extending annular protrusion facing the axis of rotation, and the stationary portion.

The first annular seal assembly and the second annular seal assembly may be disposed, respectively, at a fifth and at a sixth radial distance from the axis of rotation. The fifth radial distance may be larger than the sixth radial distance.

BRIEF DESCRIPTION OF THE DRAWINGS

An embodiment of the invention will now be described by way of example with reference to the accompanying drawings in which FIG. 2 shows a second sectional view of the rotary joint assembly of FIG. 1, wherein a second fluid passage defined by the rotatable portion is in fluid communication with the annular seal chamber.

DETAILED DESCRIPTION

Figure 1:
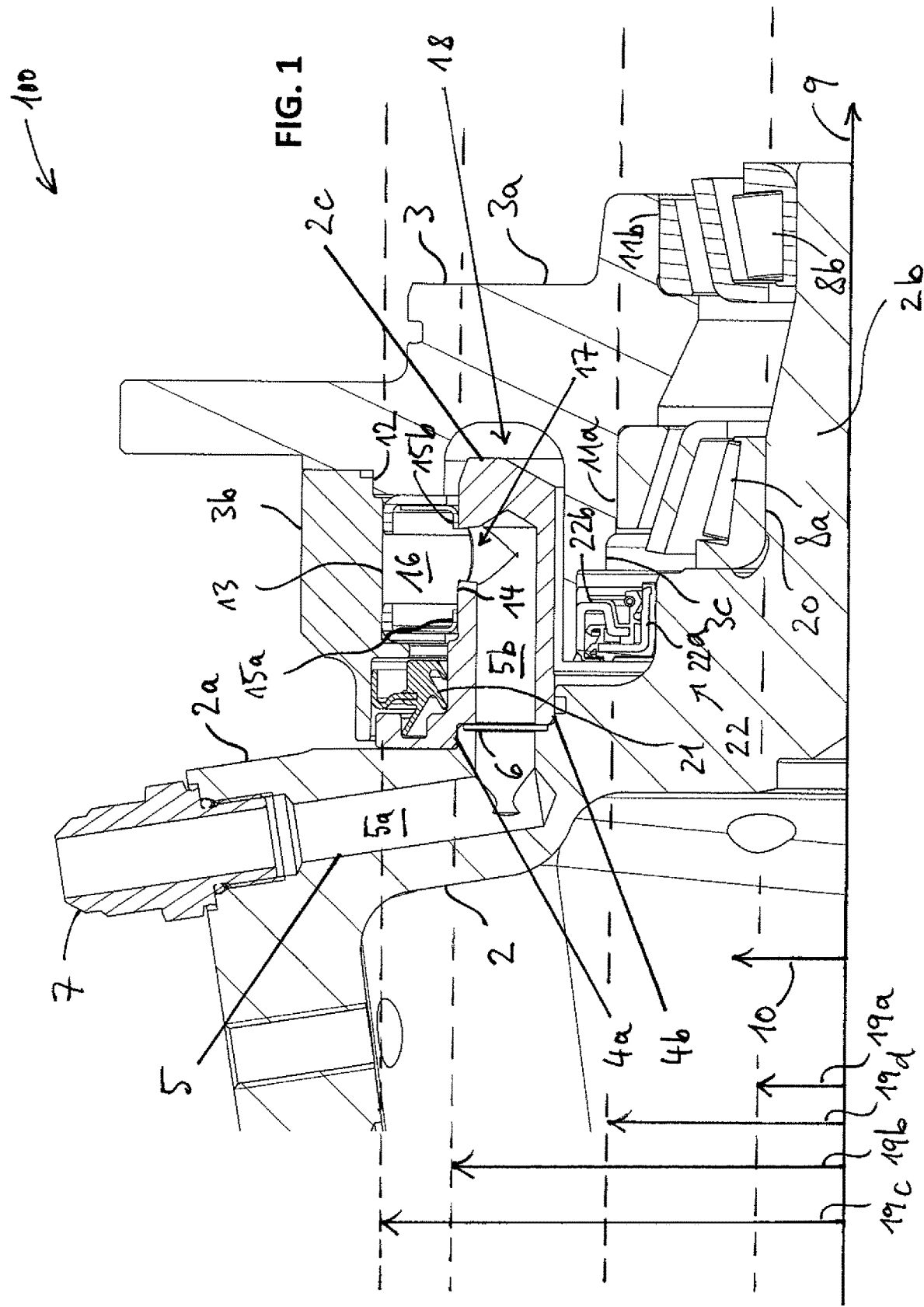
FIG. 1 shows a first sectional view of a rotary joint assembly in accordance with the invention, wherein a first fluid passage defined by a stationary portion is in fluid communication with an annular seal chamber disposed between the stationary portion and a rotatable portion.

FIG. 1 illustrates a first sectional view of a rotary joint assembly 100 for a tire inflation system of an automotive vehicle, for example of an off-highway vehicle such as a tractor or a material handling vehicle. The assembly 100 comprises a stationary portion 2, for example an axle housing or a steering knuckle. The stationary portion 2 comprises a main portion 2a, a support portion 2b, and an annular portion 2c. The main portion 2a and the support portion 2b of the stationary portion 2 are integrally formed. The annular portion 2c of the stationary portion 2 is formed a separate portion which is fixedly mounted on a first shoulder 4a and on a second shoulder 4b of the main portion 2b of the stationary portion 2. However, it is understood that in alternative embodiments not explicitly depicted here the annular portion 2c and the main portion 2a of the stationary portion 2 may be integrally formed.

The stationary portion 2 defines a first fluid passage 5 for a gaseous medium such as air. The main portion 2a of the stationary portion 2 defines a first section Sa of the first fluid passage 5, and the separate annular portion 2b of the stationary portion 2 defines a second section Sb of the first fluid passage 5. The first section Sa of the first fluid passage 5 is in fluid communication with the second section Sb of the first fluid passage 5. Sealing means 6 disposed at an interface between the first section Sa and the second section Sb prevents the leakage of fluid at the interface. The first section Sa of the first fluid passage 5 ends in a fitting 7 that is screwed into a bore in the main portion 2a of the stationary portion 2. Via the fitting 7 the first fluid passage 5 may be in fluid communication with a source of pressurized fluid such as a compressor for pressurizing the first fluid passage 5, and/or with a vent for venting the first fluid passage 5.

The rotary joint 100 further comprises a rotatable portion 3 such as a wheel hub. The rotatable portion 3 is rotatably mounted on the main portion 2b of the stationary portion 2 by means of a pair of pair of bearings 8a, 8b. The bearings 8a, 8b are configured as roller bearings and are mounted on the support portion 2b of the stationary portion 2. An axis of rotation 9 of the rotatable portion 3 defines an axial direction. A radial direction 10 is oriented perpendicular to the axial direction 9. An outer face 20 of the support portion 2b of the stationary portion 2 is disposed at a first radial distance 19a from the axis of rotation 9. The outer face 20 of the support portion 2b is facing away from the axis of rotation 9. At the outer face 20 the radius of the support portion 2b of the stationary portion 2 has a maximum value.

The rotatable portion 3 comprises a main portion 3a, a first axially extending annular protrusion 3b, and a second axially extending annular protrusion 3c. The first bearing 8a supports a first inner face 11a of the main portion 3a of the rotatable portion 3, and the second bearing 8b supports a second inner face 11b of the main portion 3a of the rotatable portion 3. The inner faces 11a, 11b of the main portion 3a of the rotatable portion 3 face toward the axis of rotation 9.

The first and the second axially extending annular protrusion 3b and 3c of the rotatable portion 3 protrude from the main portion 3a of the rotatable portion 3 in parallel to the axis of rotation 9 or essentially in parallel to the axis of rotation and toward the stationary portion 2. The main portion 3a and the second axially extending annular protrusion 3c of the rotatable portion 3 are integrally formed. The first axially extending annular protrusion 3b of the rotatable portion 3 is formed a separate portion which is fixedly mounted on a first shoulder 12 of the main portion 3a of the rotatable portion 3. However, it is understood that in alternative embodiments not explicitly depicted here the first axially extending annular protrusion 3b and the main portion 3a of the rotatable portion 3 may be integrally formed.

The annular portion 2c of the stationary portion 2 has a first annular sealing face 14, and the first axially extending annular protrusion 3b of the rotatable portion 3 has a second annular sealing face 13. The first annular sealing face 14 faces away from the axis of rotation 9, and the second annular sealing face 13 faces toward the axis of rotation 9. The first annular sealing face 14 and the second annular sealing face 13 are oriented in parallel to the axis of rotation 9.

Annular sealing lips 15a, 15b are mounted on the second annular sealing face 13 of the rotatable portion 3. The annular sealing lips 15a, 15b are in sliding sealing engagement with the first annular sealing face 14 of the stationary portion 2. The first annular sealing face 14, the second annular sealing face 13, and the annular sealing lips 15a, 15b form an annular seal chamber 16 radially disposed between the stationary portion 2 and the rotatable portion 3. The annular sealing lips 15a, 15b prevent pressurized fluid in the annular seal chamber 16 from leaking out of the annular seal chamber 16. The second section 5b of the first fluid passage 5 ends in the first annular sealing face 14 at a first fluid port 17. Thus, the first fluid port 17 in the first annular sealing face 14 provides fluid communication between the first fluid passage 5 and the annular seal chamber 16. The first annular sealing face 14, the second annular sealing face 13, and the support portion 2b of the stationary portion 2 are arranged concentrically with respect to the axis of rotation 9.

In the radial direction 10 the annular seal chamber 16 is delimited by the first annular sealing face 14 and the second annular sealing face 13. In the axial direction 9 the annular seal chamber 16 is delimited by the annular sealing lips 15a, 15b. Specifically, the first annular sealing face 14 of the stationary portion 2 is disposed at a second radial distance 19b from the axis of rotation 9, and the second annular sealing face 13 of the rotatable portion 3 is disposed at a third radial distance 19c from the axis of rotation 9. The inner face 11a of the rotatable portion 3 supported by the bearing 8a is disposed at a fourth radial distance 19d from the axis of rotation 9. The second radial distance 19b is larger than the first radial distance 19a and larger than the fourth radial distance 19d. The third radial distance 19c is larger than the second radial distance 19b.

In other words, the annular seal chamber 16 is disposed at a radial distance from the support portion 2b of the stationary portion 2 and from the bearings 8a, 8b disposed between the support portion 2b and the rotatable portion 3. This facilitates a very compact design of the rotary joint assembly 100, in particular long the axial direction 9. Particularly along the axial direction 9 the extension of an axle assembly including the rotary joint assembly 100 may usually not exceed a predetermined maximum length. For example, FIG. 1 clearly illustrates that at least the bearing 8a and the annular seal chamber 16 are disposed to at least partially overlap along the axial direction 9.

The stationary portion 2 and the rotatable portion 3 encompass an annular space 18 formed between the stationary portion 2 and the rotatable portion 3. The annular seal chamber 16 is disposed within the annular space 18. The annular space 18 is formed between the first axially extending annular protrusion 3b of the rotatable portion 3, the second axially extending annular protrusion 3c of the rotatable portion 3, the main portion 3a of the rotatable portion 3, and the stationary portion 2. In the radial direction 10 the annular space 18 is delimited by the first and the second axially extending annular protrusion 3b and 3c of the rotatable portion 3. Specifically, in the radial direction 10 the annular space 18 is delimited by an inner face of the first axially extending annular protrusion 3b of the rotatable part 3, and by an outer face of the second axially extending annular protrusion 3c of the rotatable portion 3. The inner face of the first axially extending annular protrusion 3b faces toward the axis of rotation 9, and the outer face of the second axially extending annular protrusion 3c faces away from the axis of rotation 9.

The annular portion 2c of the stationary portion 2 including the second section 5b of the first fluid passage 5 protrudes from the main portion 2a of the stationary portion 2 in the axial direction 9 and toward the rotatable portion 3. The annular portion 2c of the stationary portion 2 including the second section 5b of the first fluid passage 5 protrudes into the annular space 18 and is received in the annular space 18. The annular portion 2c of the stationary portion 2 is disposed radially between the first and the second axially extending annular protrusion 3b and 3c of the rotatable portion 3. The annular portion 2c of the stationary portion 2 is disposed radially between the bearing 8a and the annular seal chamber 16. Along the axial direction 9 the annular portion 2c of the stationary portion 2 at least partially overlaps with the bearing 8a, with the first axially extending annular protrusion 3b, and with the second axially extending annular protrusion 3c.

The rotary joint 100 further includes a first annular seal assembly 21 and a second annular seal assembly 22. The first annular seal assembly 21 seals the annular space 18 and the annular seal chamber 16 disposed within the annular space 18 from the atmosphere. The first annular seal assembly 21 is disposed between the rotatable portion 3 and the stationary portion 2, more specifically between the first axially extending annular protrusion 3b of the rotatable portion 3 and the annular portion 2c of the stationary portion 2. The first annular seal assembly 21 comprises sealing means such as an annular rubber seal ring that is mounted on the first axially extending annular protrusion 3b of the rotatable portion 3 and that is in sliding sealing engagement with the annular portion 2c of the stationary portion 2.

The second annular seal assembly is disposed between the rotatable portion 3 and the stationary portion 2 and seals the annular space 18 and the annular seal chamber 16 disposed within the annular space 18 from the bearings 8a, 8b, in particular from lubricants used for lubricating the bearings 8a, 8b. In the embodiment depicted in FIGS. 1 and 2 the second annular seal assembly comprises first sealing means 22a and second sealing means 22b. The first and the second sealing means 22a, 22b of the second seal assembly 22 may each comprise a rubber sealing ring, for example.

The first sealing means 22a of the second seal assembly 22 are mounted on the stationary portion 2, in particular on the main portion 2a of the stationary portion 2, and the second sealing means 22b of the second seal assembly 22 are mounted on the rotatable portion 3, in particular on the second axially extending protrusion 3c of the rotatable portion 3. More specifically, the second seal assembly 22 is disposed on an inner side of the second axially extending protrusion 3c of the rotatable portion 3, wherein the inner side of the second axially extending protrusion 3c faces toward the axis of rotation 9. The first and the second sealing means 22a, 22b of the second seal assembly 22 are in sliding sealing engagement with one another.

The first annular seal assembly 21 and the second annular seal assembly 22 are disposed, respectively, at a fifth and at a sixth radial distance from the axis of rotation 9, wherein the fifth radial distance is larger than the sixth radial distance. Along the axial direction 9 the second annular seal assembly 22 at least partially overlaps with the annular portion 2c of the stationary portion 2. Also, along the axial direction 9 the second annular seal assembly 22 at least partially overlaps with the annular seal chamber 16.

FIG. 2 shows a second sectional of the rotary joint assembly 100 of FIG. 1, wherein recurring features are designated with the same reference numerals in FIGS. 1 and 2. FIG. 2 shows that the rotatable portion 3, in particular the first axially extending protrusion 3b of the rotatable portion, defines a second fluid passage 23. The second fluid passage 23 ends in the second annular sealing face 13 of the rotatable portion 3 at a second fluid port 24. Via the second fluid port 24 the second fluid passage 23 is in fluid communication with the annular seal chamber 16. That is, the annular seal chamber 16 provides fluid communication between the first fluid passage 5 and the second fluid passage 23. The second fluid passage 23 ends in a fitting 25 that is screwed into a bore in the first axially extending protrusion 3b of the rotatable portion 3. Via the fitting 25 the second fluid passage 23 is in fluid communication with a pneumatic tire, for example via a wheel valve (not shown). Via the first fluid passage 5, the annular seal chamber 16, and the second fluid passage 23 the pneumatic tire may be pressurized and depressurized.

Among other things, the subject-matter of the present application may include one or more of the following aspects:

1. A rotary joint assembly (100) for a tire inflation system for a vehicle, the assembly comprising:
   a stationary portion (2) defining a first fluid passage (6), comprising a support portion (2b), and having a first annular sealing face (14), the first fluid passage (6) ending in the first annular sealing face (14);
   a rotatable portion (3) rotatably mounted on the support portion (2b), the rotatable portion (3) defining a second fluid passage (23) and having a second annular sealing face (13), the second fluid passage (23) ending in the second annular sealing face (13), wherein the rotatable portion (3) defines an axis of rotation (9) of the rotatable portion (3) and a radial direction (10) oriented perpendicular to the axis of rotation (9); and
   an annular seal chamber (16) radially disposed between the first annular sealing face (14) and the second annular sealing face (13) and providing fluid communication between the first fluid passage (6) and the second fluid passage (23);
   wherein the support portion (2b), the first annular sealing face (14), and the second annular sealing face (13) are arranged concentrically with respect to the axis of rotation (9);
   wherein the first annular sealing face (14) and the second annular sealing face (13) are oriented in parallel to the axis of rotation (9);
   wherein a maximum radius of the support portion (2b), the first annular sealing face (14), and the second annular sealing face (13) are disposed, respectively, at a first (19a), at a second (19b) and at a third radial distance (19c) from the axis of rotation (9); and
   wherein the second radial distance (19b) is larger than the first radial distance (19a), and the third radial distance (19c) is larger than the second radial distance (19b).

2. The rotary joint assembly (100) according to aspect 1, wherein the first annular sealing face (14) faces away from the axis of rotation (9), and the second annular sealing face (13) faces toward the axis of rotation (9).

3. The rotary joint assembly (100) according to one of the preceding aspects, further comprising at least one bearing (8a, 8b), wherein the rotatable portion (3) is rotatably mounted on the support portion (2b) by way of the at least one bearing (8a, 8b), the at least one bearing (8a, 8b) supporting an inner face (11a) of the rotatable portion (3), wherein the inner face (11a) of the rotatable portion (3) faces toward the axis of rotation (9) and is disposed at a fourth radial distance (19d) from the axis of rotation (9), wherein the second radial distance (19b) is larger than the fourth radial distance (19d).

4. The rotary joint assembly (100) according aspect 3, wherein the at least one bearing (8a, 8b) and the annular seal chamber (16) are at least partially overlap along an axial direction oriented in parallel to the axis of rotation (9).

5. The rotary joint assembly (100) according to one of the preceding aspects, wherein the stationary portion (2) further comprises a main portion (2a) and an annular portion (2c), wherein the main portion (2a) of the stationary portion (2) and the annular portion (2c) of the stationary portion (2) are configured as separate portions, wherein the annular portion (2c) of the stationary portion (2) is fixedly coupled to the main portion (2a) of the stationary portion (2), and wherein the first annular sealing face (14) is formed on the annular portion (2c) of the stationary portion (2).

6. The rotary joint assembly (100) according to aspect 5, wherein the main portion (2a) of the stationary portion (2) defines a first section (6a) of the first fluid passage (6), and the annular portion (2c) of the stationary portion (2) defines a second section (6b) of the first fluid passage (6) in fluid communication with the first section (6a) of the first fluid passage (6), wherein sealing means disposed at an interface of the first and the second section of the first fluid passage (6) prevent fluid leakage at the interface.

7. The rotary joint assembly (100) according to one of the preceding aspects, wherein the rotatable portion (3) comprises a main portion (3a) and a first axially extending annular protrusion (3b), wherein the first axially extending annular protrusion (3b) of the rotatable portion (3) protrudes from the main portion (3a) of the rotatable portion (3) in parallel to the axis of rotation (9) and toward the stationary portion (2), and wherein the second annular sealing face (13) is formed on the first axially extending annular protrusion (3b) of the rotatable portion (3).

8. The rotary joint assembly (100) according aspect 7, wherein the main portion (3a) of the rotatable portion (3) and the first axially extending annular protrusion (3b) of the rotatable portion (3) are configured as separate portions, wherein the first axially extending annular protrusion (3b) is fixedly coupled to the main portion (3a) of the rotatable portion (3).

9. The rotary joint assembly (100) according to one of the preceding aspects, wherein the stationary portion (2) and the rotatable portion (3) encompass an annular space (18) formed between the stationary portion (2) and the rotatable portion (3), wherein the annular seal chamber (16) is disposed within the annular space (18).

10. The rotary joint assembly (100) according to aspect 9, further comprising a first annular seal assembly (21) sealing the annular space (18) and the annular seal chamber (16) disposed within the annular space (18) from the atmosphere.

11. The rotary joint assembly (100) according to one of aspects 7 and 8 and according to aspect 10, wherein the annular space (18) is formed between the first axially extending annular protrusion (3b) of the rotatable portion (3) and the stationary portion (2), and wherein the first annular seal assembly (21) is disposed between the first axially extending annular protrusion (3b) of the rotatable portion (3) and the stationary portion (2).

12. The rotary joint assembly (100) according to one of aspects 9 to 11, further comprising at least one bearing (8a, 8b) and a second annular seal assembly (22), wherein the second annular seal assembly (22) is disposed between the stationary portion (2) and the rotatable portion (3) and seals the annular space (18) and the annular seal chamber (16) disposed within the annular space (18) from the at least one bearing (8a, 8b), in particular from lubricants used for lubricating the at least one bearing (8a, 8b).

13. The rotary joint assembly (100) according to aspect 12, wherein the second annular seal assembly (22) is disposed on an inner side of the rotatable portion (3), the inner side of the rotatable portion (3) facing toward the axis of rotation (9).

14. The rotary joint assembly (100) according to one of aspects 12 and 13, wherein the rotatable portion (3) further comprises a second axially extending annular protrusion (3c), wherein the second axially extending annular protrusion (3c) of the rotatable portion (3) protrudes from the main portion (3a) of the rotatable portion (3) in parallel to the axis of rotation (9) and toward the stationary portion (2), and wherein the second annular seal assembly (22) is disposed between the second axially extending annular protrusion (3c) of the rotatable portion (3), in particular on an inner side of the second axially extending annular protrusion (3c) facing toward the axis of rotation (9), and the stationary portion (2).

15. The rotary joint assembly (100) according to one of aspects 10 and 11 and according to one of aspects 12 to 14, wherein the first annular seal assembly (21) and the second annular seal assembly (22) are disposed, respectively, at a fifth and at a sixth radial distance from the axis of rotation (9), wherein the fifth radial distance is larger than the sixth radial distance.

The invention claimed is:

1. A rotary joint assembly for a tire inflation system for a vehicle, the assembly comprising:
    a stationary portion defining a first fluid passage, comprising a support portion, and having a first annular sealing face, the first fluid passage ending in the first annular sealing face;
    at least one bearing;
    a rotatable portion rotatably mounted on the support portion by way of the at least one bearing, the rotatable portion defining a second fluid passage and having a second annular sealing face, the second fluid passage ending in the second annular sealing face, wherein the rotatable portion defines an axis of rotation of the rotatable portion and a radial direction oriented perpendicular to the axis of rotation, the at least one bearing supporting an inner face of the rotatable portion, wherein the inner face of the rotatable portion faces toward the axis of rotation; and
    an annular seal chamber radially disposed between the first annular sealing face and the second annular sealing face and providing fluid communication between the first fluid passage and the second fluid passage;
    wherein the at least one bearing and the annular seal chamber at least partially overlap along an axial direction oriented in parallel to the axis of rotation.

2. The rotary joint assembly according to claim 1,
    wherein the support portion, the first annular sealing face, and the second annular sealing face are arranged concentrically with respect to the axis of rotation;
    wherein the first annular sealing face and the second annular sealing face are oriented in parallel to the axis of rotation;
    wherein a maximum radius of the support portion, the first annular sealing face, and the second annular sealing face are disposed, respectively, at a first, at a second and at a third radial distance from the axis of rotation; and
    wherein the second radial distance is larger than the first radial distance, and the third radial distance is larger than the second radial distance.

3. The rotary joint assembly according to claim 1, wherein the first annular sealing face faces away from the axis of rotation, and the second annular sealing face faces toward the axis of rotation.

4. The rotary joint assembly according to claim 2, wherein the inner face of the rotatable portion is disposed at a fourth radial distance from the axis of rotation, wherein the second radial distance is larger than the fourth radial distance.

5. The rotary joint assembly according to claim 1, wherein the stationary portion further comprises a main portion and an annular portion, wherein the main portion of the stationary portion and the annular portion of the stationary portion are configured as separate portions, wherein the annular portion of the stationary portion is fixedly coupled to the main portion of the stationary portion, and wherein the first annular sealing face is formed on the annular portion of the stationary portion.

6. The rotary joint assembly according to claim 5, wherein the main portion of the stationary portion defines a first section of the first fluid passage, and the annular portion of the stationary portion defines a second section of the first fluid passage in fluid communication with the first section of the first fluid passage, wherein sealing means disposed at an interface of the first and the second section of the first fluid passage prevent fluid leakage at the interface.

7. The rotary joint assembly according to claim 1, wherein the rotatable portion comprises a main portion and a first axially extending annular protrusion, wherein the first axially extending annular protrusion of the rotatable portion protrudes from the main portion of the rotatable portion in parallel to the axis of rotation and toward the stationary portion, and wherein the second annular sealing face is formed on the first axially extending annular protrusion of the rotatable portion.

8. The rotary joint assembly according claim 7, wherein the main portion of the rotatable portion and the first axially extending annular protrusion of the rotatable portion are configured as separate portions, wherein the first axially extending annular protrusion is fixedly coupled to the main portion of the rotatable portion.

9. The rotary joint assembly according to claim 1, wherein the stationary portion and the rotatable portion encompass an annular space formed between the stationary portion and the rotatable portion, wherein the annular seal chamber is disposed within the annular space.

10. The rotary joint assembly according to claim 9, further comprising a first annular seal assembly sealing the annular space and the annular seal chamber disposed within the annular space from the atmosphere.

11. The rotary joint assembly according to claim 7, wherein an annular space is formed between the first axially extending annular protrusion of the rotatable portion and the stationary portion, and wherein a first annular seal assembly is disposed between the first axially extending annular protrusion of the rotatable portion and the stationary portion.

12. The rotary joint assembly according to claim 9, further comprising a seal assembly disposed between the stationary portion and the rotatable portion and seals the annular space and the annular seal chamber disposed within the annular space from the at least one bearing.

13. The rotary joint assembly according to claim 12, wherein the seal assembly is disposed on an inner side of the rotatable portion, the inner side of the rotatable portion facing toward the axis of rotation.

14. The rotary joint assembly according to claim 12, wherein the rotatable portion further comprises an annular protrusion, wherein the annular protrusion of the rotatable portion protrudes from a main portion of the rotatable portion in parallel to the axis of rotation and toward the stationary portion, and wherein the seal assembly is disposed between the annular protrusion of the rotatable portion and the stationary portion, and on an inner side of the annular protrusion facing toward the axis of rotation.

15. The rotary joint assembly according to claim 10, wherein the first annular seal assembly and a second annular seal assembly are disposed, respectively, at a fifth and at a sixth radial distance from the axis of rotation, wherein the fifth radial distance is larger than the sixth radial distance.

\* \* \* \* \*